(12) United States Patent
Hancock et al.

(10) Patent No.: US 12,630,267 B2
(45) Date of Patent: *May 19, 2026

(54) PRESSURIZED LIVEWELL SYSTEM AND METHOD

(71) Applicants: Thomas Hancock, Summerville, SC (US); Jeff Hudson, Summerville, SC (US)

(72) Inventors: Thomas Hancock, Summerville, SC (US); Jeff Hudson, Summerville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,219

(22) Filed: Nov. 8, 2024

(65) Prior Publication Data

US 2025/0065991 A1 Feb. 27, 2025

Related U.S. Application Data

(63) Continuation of application No. 18/322,153, filed on May 23, 2023, now Pat. No. 12,172,735.

(51) Int. Cl.
B63B 35/26 (2006.01)
A01K 97/05 (2006.01)

(52) U.S. Cl.
CPC .............. B63B 35/26 (2013.01); A01K 97/05 (2013.01)

(58) Field of Classification Search
CPC ........ B63B 35/26; A01K 63/02; A01K 97/05; A01K 97/20
USPC ................................................... 43/54.1–57
See application file for complete search history.

(56) References Cited

U.S. PATENT DOCUMENTS

| | | | |
|---|---|---|---|
| 4,074,651 A | | 2/1978 | Arduser |
| 4,748,765 A | * | 6/1988 | Martin ................... A01K 97/05 |
| | | | 43/55 |
| 4,766,691 A | | 8/1988 | Lynn |

(Continued)

FOREIGN PATENT DOCUMENTS

| | | | | |
|---|---|---|---|---|
| FR | 2754141 A1 | * | 4/1998 | ............. A01K 63/02 |
| KR | 101495268 B1 | * | 2/2015 | |

(Continued)

OTHER PUBLICATIONS

Merged translation of FR_2754141 (Year: 1998).*

(Continued)

*Primary Examiner* — Morgan T Jordan
(74) *Attorney, Agent, or Firm* — Fox Rothschild LLP

(57) ABSTRACT

A pressurized livewell system is designed to autonomously maintain a slightly elevated water pressure within the livewell tank, and to keep the tank substantially full of water at all times to prevent injury or death of live bait due to sloshing of water within the tank when the boat is in rough water. The system includes a tank with a lid, a water pressure sensor connected to an electronic controller programmed with an algorithm, which controls voltage to a pump, and a water outflow system including an in-line low pressure check valve. The pressure sensor continuously sends water pressure data to the electronic controller, which uses the algorithm calculations to continuously adjusts pump voltage, and thus water output rate, to maintain a constant pressure, preferably between 0.08 psi and 0.1 psi. The system may be operated in manual mode or automatic mode.

18 Claims, 5 Drawing Sheets

(56) References Cited

U.S. PATENT DOCUMENTS

| | | | | |
|---|---|---|---|---|
| 4,815,411 A * | 3/1989 | Burgess | B63B 35/26 | |
| | | | 43/57 | |
| 4,832,073 A | 5/1989 | Campau | | |
| 4,907,772 A * | 3/1990 | Willinger | A01K 63/006 | |
| | | | 248/231.71 | |
| 4,945,672 A * | 8/1990 | Raia | A01K 97/05 | |
| | | | 43/57 | |
| 4,970,982 A | 11/1990 | Martin | | |
| 4,994,177 A | 2/1991 | Bogar, Jr. | | |
| 5,010,836 A * | 4/1991 | Riviezzo | F16K 27/065 | |
| | | | 251/304 | |
| 5,236,175 A | 8/1993 | Campau | | |
| 5,390,439 A | 2/1995 | Kilian, III et al. | | |
| 5,406,740 A | 4/1995 | Wilkin | | |
| 6,038,993 A * | 3/2000 | Vento | B63B 13/00 | |
| | | | 43/57 | |
| 6,044,901 A * | 4/2000 | Basala | B63B 35/26 | |
| | | | 165/41 | |
| 6,101,759 A | 8/2000 | Power | | |
| 6,810,617 B1 | 11/2004 | Burroughs et al. | | |
| 7,024,814 B1 * | 4/2006 | McDougle | A01K 97/05 | |
| | | | 210/189 | |
| 7,611,130 B2 * | 11/2009 | Sylvester | A01K 63/042 | |
| | | | 261/119.1 | |
| 8,002,245 B2 * | 8/2011 | Sylvester | A01K 63/042 | |
| | | | 261/119.1 | |
| 8,281,729 B1 * | 10/2012 | Beck | B63B 35/26 | |
| | | | 43/57 | |
| 9,345,238 B1 | 5/2016 | Higginbotham | | |
| 12,010,978 B1 * | 6/2024 | Kollmann | A01K 63/04 | |
| 2002/0046481 A1 * | 4/2002 | Vento | A01K 97/05 | |
| | | | 43/55 | |
| 2005/0183431 A1 * | 8/2005 | Rabal | A01K 97/20 | |
| | | | 62/185 | |
| 2005/0204610 A1 * | 9/2005 | Bogart | A01K 97/20 | |
| | | | 43/55 | |
| 2007/0068063 A1 | 3/2007 | Simpson | | |
| 2009/0188152 A1 * | 7/2009 | Davin | A01K 97/05 | |
| | | | 43/56 | |
| 2013/0319313 A1 * | 12/2013 | Hancock, Jr. | B63B 19/12 | |
| | | | 114/201 R | |
| 2016/0120163 A1 * | 5/2016 | Arden | A01K 63/042 | |
| | | | 43/57 | |
| 2017/0013810 A1 * | 1/2017 | Grabell | A01K 61/80 | |
| 2017/0120986 A1 * | 5/2017 | Burnett | B63B 29/02 | |
| 2018/0365246 A1 | 12/2018 | Laster et al. | | |
| 2019/0200584 A1 * | 7/2019 | Holm | A01K 61/95 | |
| 2020/0236912 A1 * | 7/2020 | Hedges | A01K 63/02 | |
| 2023/0180723 A1 * | 6/2023 | Ostmeyer | A01K 63/02 | |
| | | | 43/54.1 | |
| 2024/0023532 A1 * | 1/2024 | Stokes | A01K 63/042 | |

FOREIGN PATENT DOCUMENTS

| | | | | |
|---|---|---|---|---|
| WO | WO-2016110118 A1 * | 7/2016 | | A01K 63/02 |
| WO | WO-2016110133 A1 * | 7/2016 | | A01K 63/02 |

OTHER PUBLICATIONS

Merged translation of KR_101495268 (Year: 2015).*
Merged translation of WO_2016110118 (Year: 2016).*
Merged translation of WO_2016110133 (Year: 2016).*

* cited by examiner

PRESSURIZED LIVEWELL SYSTEM AND METHOD

CROSS REFERENCE TO RELATED APPLICATIONS

The present application is a continuation-in-part of U.S. application Ser. No. 18/322,153 entitled Unmanned Aerial Vehicle Search and Rescue System, filed on May 23, 2023. All of the foregoing applications are hereby incorporated by reference in their entireties.

FIELD OF THE INVENTION

The present invention relates generally to livewells for maintaining live bait for fishing and the like. More specifically, the present invention relates to a pressurized livewell system that may be installed on a boat, in order to keep live bait alive and unharmed, particularly in rough water.

BACKGROUND OF THE INVENTION

Modern day sportfishing boats are routinely equipped with one or more livewells to contain live bait, such as bait fish. Typical livewells include a well or container that holds water, an intake hose and pump for pumping water from the body of water beneath the boat into the container, and a drainage hose that allows water to be drained from the container after use. Some livewells also include aerators to oxygenate the water, which helps to keep the live bait alive for longer periods of time.

One issue with livewells is that the water in the livewell tends to slosh around when the boat is running through rough water, which degrades the health of the live bait. This sloshing effect tends to disorient the bait fish, and in extreme circumstances, can kill the baitfish, rendering them much less desirable as fishing bait.

Many improvements have been made to livewells over the years, in an effort to keep bait alive and healthier for longer periods of time. The following references disclose various improvements to livewells, and each of these documents are incorporated herein by reference, in their entireties:

U.S. Patent Application Number US20070068063A1

In a boat that was not designed for or required a live well, a built-in tank, for the holding of newly caught fish, a portable tank will serve as a live well that will hold fish that are caught and a bait well that would receive minnows or leaches. An electric pump powered by a battery of the boat or portable battery pumps water from the lake into the tank to fill, aerate and circulate the water in the tank. An electric pump powered by a battery of the boat or portable battery pumps water out of the tank and provides for overflow. A series of three valves control the water intake, water overflow and re-circulation of water in the tank. These operations are controlled by the open or closed combinations of the three valves. The majority of the live well is to receive newly caught fish with the smaller portion of the live well to serve as the holder for live bait. Aerated water filters throughout the entire live well.

U.S. Patent Application Number US20180365246A1

Livewells of a vessel are used to store caught fish, such as during fishing competitions. Example apparatuses, systems, and methods are provided herein that may track and use fishing information for efficient operation and control of livewells and the associated pumps. An example marine electronic device of a vessel comprises a user interface with a display screen, a processor, and memory including computer program code. The memory and the computer program code are configured to, with the processor, cause the marine electronic device to receive an indication of a fish catch and cause, in response to receiving the indication of the fish catch, a pump associated with a livewell of the vessel to one of fill the livewell with water or recirculate water in the livewell, wherein the water is pumped from a body of water in which the vessel is at least partially submerged.

U.S. Pat. No. 4,074,651

A forced aerating apparatus for an inboard live well positioned within a fishing boat. The apparatus includes a water pipe having an intake end positioned outwardly of the boat below the water line. The water pipe has a discharge end positioned within the boat adjacent the well for supplying water thereto. A water aerator is provided on the discharge end of the water pipe. A water pump is mounted exteriorly of the well and is connected to the water pipe for selectively pumping water from outside the boat through the water aerator during the periods that the boat is not traveling through the water. Water is automatically supplied to the live well when the boat is traveling through the water. The apparatus also includes means for powering the pump.

U.S. Pat. No. 4,766,691

This invention relates generally to apparatus for replenishing the supply of fresh water to a bait well or bucket of a waterborne vessel, and more particularly to a housing removably connectable to a bracket on the exterior of the transom of a motor-powered fishing boat, said housing having a depending ram water pickup extending generally below the bottom surface of the craft, said pickup enclosing an aperture in the housing for conveying a forced flow of water from the exterior of said housing to the bait well or bait bucket of the boat while the boat is moving across the water. A small "silent-type" electric water pump is associated with the housing for selectively supplying the live bait well with a supply of fresh water from the body of water being fished from while the boat is at rest.

U.S. Pat. No. 4,832,073

A distribution system for filling a baitwell in a boat includes a low pressure pump and a dual check valve. The fluid flow into the system is divided so that the pressure on the pump is reduced, thus enabling the use of an inexpensive pump. The check valve permits the influx of fresh water without the need for recirculating the existing water in the baitwell and also prevents backflow from the baitwell.

U.S. Pat. No. 4,970,982

In a fishing boat, a built-in tank which serves the combined function of a livewell for holding fish that are caught and a bait well for receiving a minnow bucket. An electric pump powered by the battery of the boat pumps water from the lake into the tank in a manner to aerate the water and circulate it in the tank. A drain tube drains off water from the tank and prevents overflow. One half of the tank serves as a bait well in which a minnow bucket may be suspended. The other half of the tank is a livewell which receives newly caught fish. The livewell and bait well have separate hinged lids.

U.S. Pat. No. 4,994,177

A bucket-type shaped container including a removable top and downwardly facing suction cups is provided for disposition within and suction cup support from the bottom of a reservoir containing water and bait. The side walls of the container include a large number of water inlet openings formed therein and a flexible panel of filtering material is formed into generally cylindrical configuration and snugly telescoped within the container. A flexible resilient panel member is flexed into generally cylindrical configuration with overlapped ends and is telescoped into the cylindrical filter panel and includes openings formed therethrough registered with the container wall openings, the flexible panel member exerting an outward biasing force on the filter panel. An electric motor powered submersible pump is wholly contained within the container and includes an inlet within the container and an outlet conduit which extends outwardly of the container and includes an outlet end within the associated receptacle above the water level therein and equipped with water sprayed discharge structure for discharging jets of water therefrom downwardly onto the surface of the water within the receptacle exteriorly of the container.

U.S. Pat. No. 5,236,175

A water distribution system for use between a water source and a livewell in a boat, capable of use with a boat in either moving or stationary states in the water source, and including means for operating the water distribution system in any one of three modes: a recirculate-only mode, a dual fill and recirculate mode, and a drain without refilling mode. Means are also provided, by utilization of an apparatus achieving tactile feedback, for apprising the operator of when the system is operating properly in a drip-tight, recirculation-only mode.

U.S. Pat. No. 5,390,439

A bait container flow regulator is provided for use in a bait container system for transporting live bait to a fishing site. The bait container system includes a water containment vessel for carrying water and a quantity of bait fish. The water containment vessel has a closed bottom, an open (or closable) top, a side wall portion, a water inlet for delivering a flow of water to the water containment vessel and one or more water outlets. The bait container flow regulator includes a water inlet conduit that is mountable to the water inlet and sized to extend to a water discharge location in the water containment vessel. A water regulating outlet is mounted on the water inlet conduit for positioning at the water discharge location. A discharge cap is mounted on the water inlet conduit for limiting the flow of water through the water regulating outlet. The discharge cap is configured for movement in response to the flow of water between a first position substantially covering the water regulating outlet when little or no water is flowing in the water inlet conduit, to a second position wherein the water regulating outlet is at least partially uncovered as water flow in the water inlet conduit increases.

U.S. Pat. No. 5,406,740

A bait tank which has a smoothly contoured interior wall surface of the tank so that the fish that are swimming in the tank will not come into contact with any protrusion. Inlet water within the internal chamber of the tank is supplied in a direction tangential to the wall surface of the internal chamber of the tank to provide a continuous directional current for the fish to swim into. The access opening through the top of the bait tank is closable by a removable cutting board. A light is provided within the bottom of the tank to provide illumination of the internal chamber of the tank.

U.S. Pat. No. 6,101,759

A battery operated storage container which is divided into two compartments, one for bait and a second for fish caught. It incorporates a pump for filling the compartments to a preset level and a pump to empty the compartments. It also contains an electronic control panel which allows the user to select which functions he/she wants to perform. These functions include filling, emptying, recycling, and aerating the water. The functions can be performed simultaneously or independently.

U.S. Pat. No. 6,810,617

A livewell tank for use on a boat is provided having a bottom and a sidewall section forming an interior compartment. A top is coupled with the sidewall section and extends inwardly to cover the interior compartment about the periphery of the sidewall section. An overflow drain is located proximate the top of the tank and a baffle inhibiting turbulent flow is positioned between the overflow drain and the bottom of the tank.

U.S. Pat. No. 9,345,238

A portable bait tank is provided with an exteriorly mounted aerator pump mounted within a protective cavity of the body of the tank. The bait tank also includes a molded in filter box plus a lid for housing a gravity filter and an aerator. An auxiliary, valve-operated pump-out port enables the pump to expel water from the bait container. The valve for the pump-out port is operated by moving the aerator head between a circulating position and a pump-out position. The bait tank also includes an access port that has splash-inhibiting lips that extend downwardly into the container formed by the tank body and a deep-seated oxygen bottle holder and accompanying orifice for the oxygen bottle tubing.

However, none of the above-referenced livewell systems are designed to be pressurized, particularly so that they maintain precise pressure that is slightly above the ambient pressure, under all kinds of conditions. It would be desirable to design a pressurized livewell system that maintains this slightly elevated water pressure, ensuring that the livewell is substantially full of water to prevent sloshing and aguating the live bait, without having water running out of the top of the livewell.

BRIEF SUMMARY OF THE INVENTION

The present invention relates to a pressurized livewell system that is designed to maintain a slightly elevated water pressure within the livewell, and to keep the livewell substantially full of water at all times to prevent injury or death of live bait due to the effects of sloshing of water within the tank when the boat is in rough water. The livewell system includes, in one embodiment, a well or tank for containing water and live bait, a lid that opens and closes to allow access through the top of the tank, an intake system comprising a pair of intake hoses, where one hose feeds water into the tank to an upper portion thereof and one hose feeds water to a lower portion of the tank, and an intake pump connected to the intake hoses. One drain hose is connected to the bottom of the livewell, and a second drain hose is attached to a plenum, which serves to collect sediment and debris from the bottom of the livewell tank. The second drain hose also includes a check valve, so that the water only drains from that drain hose above a designated pressure. The livewell system also includes a water pressure sensor, such as a pressure transducer, which constantly monitors the water pressure.

The intake hoses, which are used to transfer water into the livewell tank, are preferably positioned in an offset orientation toward one side of the tank in order to gently circulate the water in the tank in a uniform manner, so that the water circulates at generally the same speed, both near the top of the tank, and near the bottom, as well. The pump is operated by an electronic controller, which is also operatively connected to the pressure sensor. The electronic controller is preferably programmed with an algorithm that regulates the pressure by increasing or decreasing the voltage of the pump, which controls output pressure of the pump, in order to maintain a constant water pressure in the tank.

In one embodiment, the water pressure may be operated manually, or may be automated to maintain any desired water pressure autonomously. In manual mode, a user may control the voltage to the pump via buttons (or icons, if used with a touchscreen, for instance) with up or down arrows, for example, where the button with the up arrow increases voltage to the pump, and thus pump output pressure, and the button with the down arrow decreases voltage to the pump, thus decreasing the pump output pressure. In automatic mode, the user simply sets the desired pressure, and the system is designed to maintain that pressure by increasing or decreasing voltage to the pump, based on the water pressure as measured by the water pressure sensor.

In preferred embodiments, the system is installed on a boat, which optimally includes a pair of livewells, one on the port side and one on the starboard side. The system may include multiple, redundant pumps and an electronic controller that maintains constant water pressure in both tanks. Ideally, the system provides a constant flow of water into the tank and out of the tank, maintaining a constant water pressure and a substantially full tank of water, and creating a vacuum effect when the lid of the tank is in the closed position. This system prevents sloshing, and maintains a healthy, undisturbed environment for live bait, even in choppy or rough water.

DESCRIPTION OF THE DRAWINGS

Figure 1:
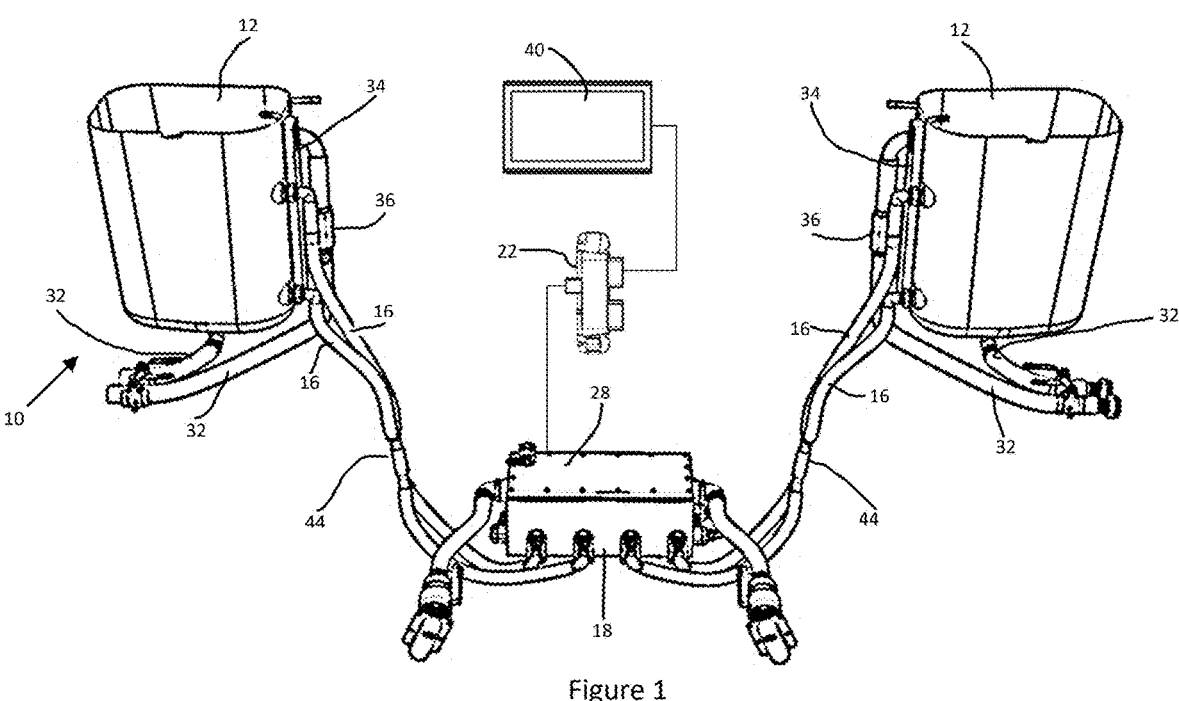
FIG. 1 is a perspective view of a pressurized livewell system.
Figure 2:
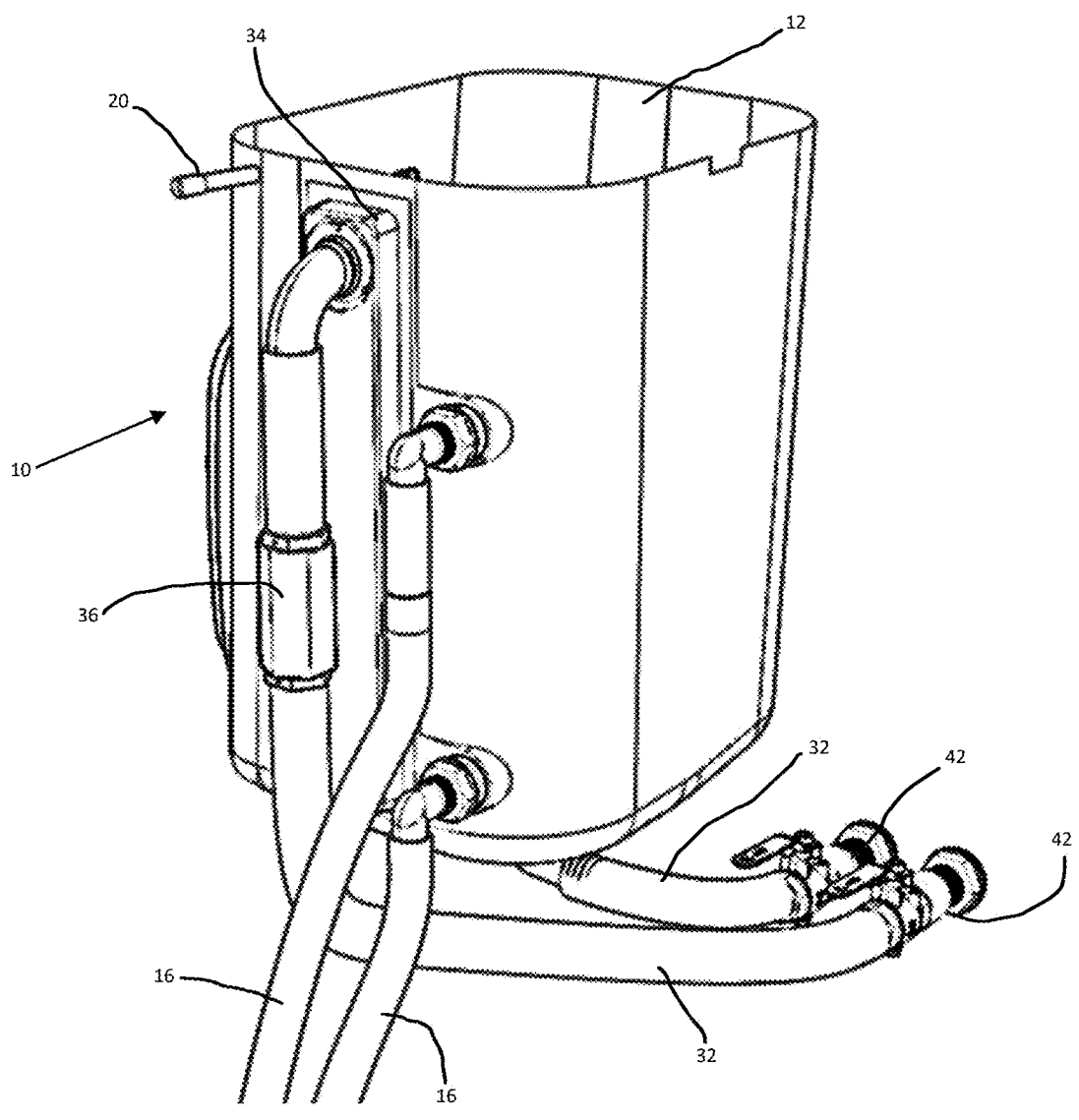
FIG. 2 is a side perspective view of a pressurized livewell system including a water intake system.
Figure 3:
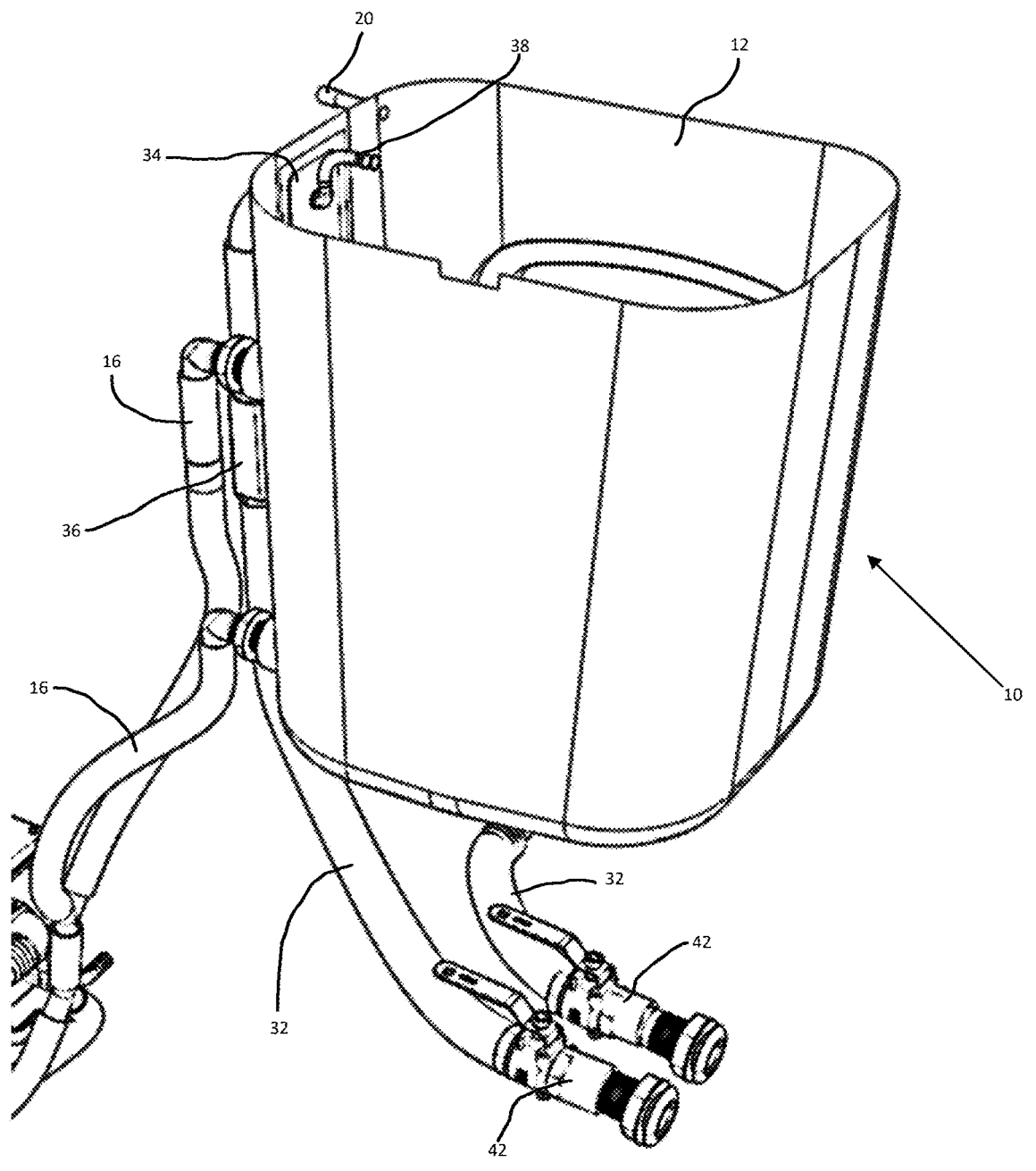
FIG. 3 is an alternate side perspective view of a pressurized livewell system including a water intake system.
Figure 4:
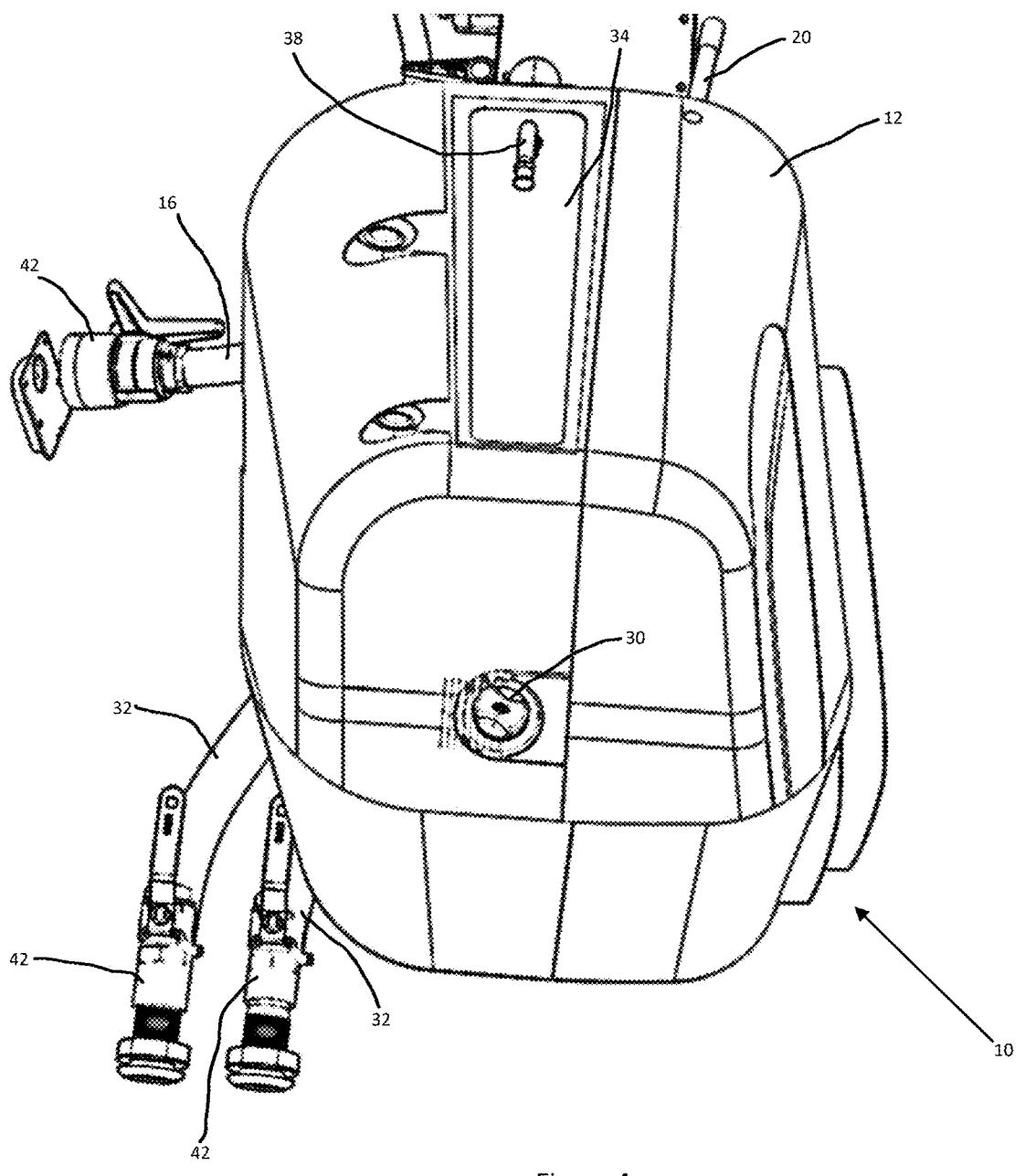
FIG. 4 is a top down perspective view of a pressurized livewell system including a water intake system and a plenum.
Figure 5:
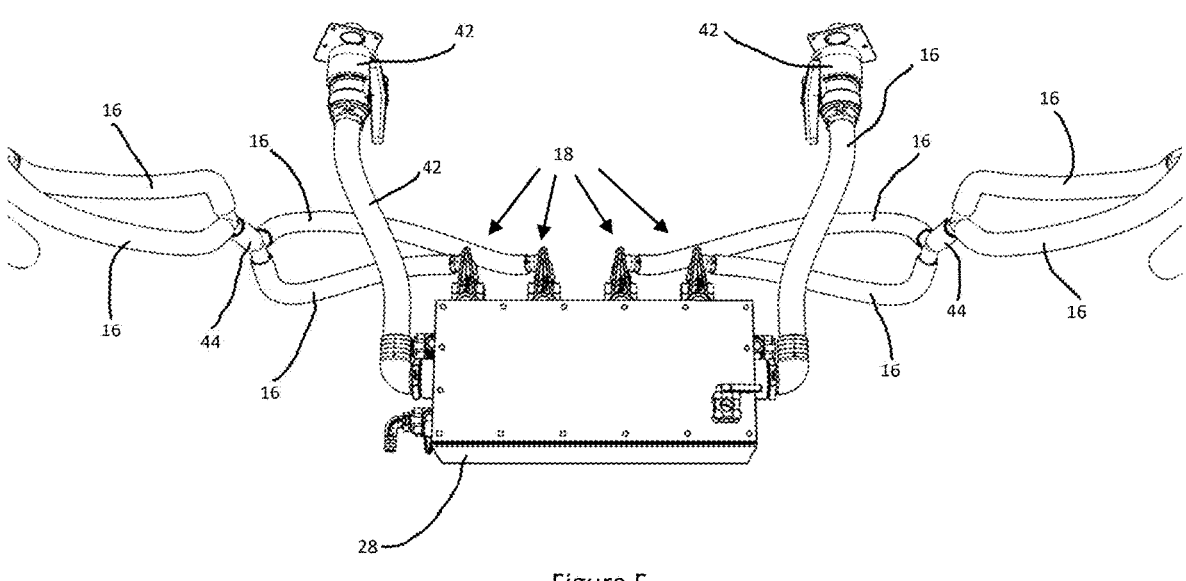
FIG. 5 is a perspective view of a sea chest for use with a pressurized livewell system.

These and other features, aspects, and advantages of the present invention will become better understood with regard to the following description and accompanying drawings where:

FIG. 1 is a perspective view of one embodiment of a pressurized livewell system, illustrating a pair of livewell tanks positioned on two sides of a boat (port and starboard) adjacent the stern, and further illustrating water intake system including a series of intake hoses, a sea chest including a plurality of water pumps and an electronic controller, a pressure sensor (transducer), an outflow system including a drain and drain hose attached to the bottom of each tank, a plenum and a drain hose attached to an upper portion of the plenum, and an electronic controller and control interface operatively connected to the pumps in the sea chest;

FIG. 2 is a perspective view of one embodiment of a pressurized livewell system, illustrating a livewell tank, and further illustrating water intake system including a pair of intake hoses, wherein a first intake hose is operatively attached to a lower portion of the tank, and a second intake hose positioned above the first intake hose at an upper portion of the tank, a pressure transducer, an air vent, and an outflow system including a drain and drain hose attached to a bottom portion of the tank, a plenum attached to one side of the tank, and a second drain hose including an in-line check valve, wherein the drain hoses terminate at an opening in the side of the boat hull, and each drain hose includes a shut-off valve;

FIG. 3 is a perspective view of one embodiment of a pressurized livewell system, illustrating a livewell tank, and further illustrating water intake system including a pair of intake hoses, wherein a first intake hose is operatively attached to a lower portion of the tank, and a second intake hose positioned above the first intake hose at an upper portion of the tank, a pressure transducer, an air vent, and an outflow system including a drain and drain hose attached to a bottom portion of the tank, a plenum attached to one side of the tank, and a second drain hose including an in-line check valve, wherein the drain hoses terminate at an opening in the side of the boat hull, and each drain hose includes a shut-off valve;

FIG. 4 is a perspective view of one embodiment of a pressurized livewell system, illustrating a livewell tank, and further illustrating water intake system wherein a first intake hose is operatively attached to a lower portion of the tank, and a second intake hose positioned above the first intake hose at an upper portion of the tank, a pressure transducer, an air vent, and an outflow system including a drain and drain hose attached to a bottom portion of the tank, a plenum attached to one side of the tank, and a second drain hose including an in-line check valve, wherein the drain hoses terminate at an opening in the side of the boat hull, and each drain hose includes a shut-off valve; and FIG. 5 is a perspective view of one embodiment of a water intake system that forms part of a pressurized livewell system, illustrating a sea chest that includes a four water intake pumps, a pair of intake hoses for receiving water from a body of water, a series of intake hoses for delivering water from the sea chest to two livewell tanks, wherein the intake hoses between the sea chest and the tanks are each attached to a separate pump, and water from each pump flows through a dedicated intake hose for that specific pump, and then through adapter for combining and then redividing the water flow to two separate intake hoses that terminate in an operative connection to one of the two livewell tanks.

DETAILED DESCRIPTION OF THE INVENTION

In a first embodiment of the present invention, a pressurized livewell system 10 preferably includes a tank 12 for holding water, a hinged lid that may pivot between an open and closed position, a water intake system including intake hoses 16 and at least one water intake pump 18, a water outflow system, a pressure sensor 20 such as a pressure transducer, and an electronic controller 22, as shown in FIGS. 1-5.

Intake System

The intake system comprises at least one pump 18 operatively connected to a pair of intake hoses 16, where the first intake hose 16 is operatively connected near the bottom of the tank 12, and the second intake hose 16 is operatively connected near the top of the tank 12. The intake hoses 16 are preferably positioned in an offset fashion on one side of the tank 12, near the rear portion of the tank 12, as shown, so that the water in the tank circulates uniformly at generally the same speed throughout the tank 12. The intake hoses 16 may be two separate hoses, or may be a single hose operatively connected to the pump 18, and then divided into a pair of hoses for attachment to the tank 12 as described above. The distal end of the intake hose 16 (or hoses) extends to an opening in the hull of the boat, so that the pump 18 may transfer water from the body of water beneath the boat into the tank 12. On the exterior of the hull, the openings used for water intake may further include high speed pickups, which are essentially scoops that are oriented in a forward direction, and which serve to force water into the opening when the boat is underway.

In one embodiment, a sea chest 28 is preferably positioned adjacent the opening (or openings) in the interior of the boat hull. Sea chests 28 are essentially plumbed boxes installed in the bilge of a boat, as shown in FIGS. 1 and 5. A pair of intake hoses 16 fill a watertight box that contains multiple livewell pumps that, in turn, deliver clean, bubble-free seawater or lake water to the individual livewell tank(s) 12. There are several advantages to this type of system, including the removal of air from the water and the prevention of air locks. The components, including multiple pumps 18, are condensed with centralized access, so that a user doesn't have to search for pumps, hoses, or wiring if they have a problem. Additionally, the multiple intake pumps 18 provide for redundancy, so that if a pump 18 fails or experiences an operational issue, other intake pumps 18 may still remain operational, providing a continuous flow of water to the livewell tank(s) 12.

In one embodiment, as shown in FIGS. 1 and 5, pressurized livewell system includes two tanks 12, one positioned on the starboard side of the boat, and one on the port side. The intake hoses 16 are arranged so that a pair of intake hoses 16 draw water from outside of the boat and into the sea chest 28, which includes four separate water pumps 18. Each pump has an intake hose 16 attached thereto, and two of the pumps 18 transfer water to each tank 12. The intake hoses 16 between the sea chest 28 and the tanks 12 form a 'FIG. 8' configuration, so that the water from two pumps 18 flows through two intake hoses 16 that terminate in operable connection to an adapter 44 that combines the water flow from the two pumps 18, and then divides the water flow into two separate intake hoses 16 that are attached to one of the tanks 12, as described herein. In this way, if a pump 18 for one of the tanks 12 fails, the second pump 18 is still capable of pumping water into that tank 12. Thus, each tank 12, in this embodiment, receives water from two separate pumps 18 in a redundant system that remains functional in the event of a pump failure during operation.

Drainage/Outflow System

The pressurized livewell system also includes a drainage/outflow system, including a drain 30 at the bottom of the tank 12 that is connected to a drain hose 32. The drain 30 may be plugged while the livewell system 10 is in operation, and may be unplugged to drain the water out of the tank 12 when the tank 12 is not in use. The other end of the drain hose 32 extends to an opening, preferably through the side of the boat hull, where the water drains back out into the body of water (or onto the ground, if the boat is on a trailer, for instance).

A second drain hose 32 is attached, at one end, to a plenum 34 positioned in a vertical orientation on the outside of the tank 12. The second drain hose 32 is attached to an upper portion of the plenum 34, while the lower portion of the plenum 34 includes an opening to the tank 12 itself. In this way, water from the tank 12 flows through the bottom of the plenum 34, and upwardly to the top, where water flows outwardly and into the second drain hose 32, and ultimately through an opening in the side of the boat hull. This arrangement serves to collect sediment and debris from the bottom of the livewell tank 12, which is continuously expelled through the second drain hose 32 during operation. The second drain hose 32 also preferably includes an in-line low-pressure check valve 36, so that the water only drains from that drain hose 32 above a designated pressure. In a preferred embodiment, the low-pressure check valve 36 may include pressure adjustment capabilities by using desired spring settings, and may serve as a vacuum breaker, if desired. Shut-off valves 42 are preferably attached to all drain hoses and intake hoses adjacent the openings in the hull through which the water flows inwardly and outwardly, and may be operated manually to prevent water from flowing therethrough when the system is not in operation.

In one embodiment, an air vent assembly is attached to an inner portion of the livewell tank 12, where an opening allows air to flow outwardly through the upper portion of the plenum 34. The air vent assembly preferably includes an air-tight coupling attached to the opening, and an air hose 38 for expelling air from the plenum 34. The first end of an air hose 38 is attached to the air-tight coupling adjacent the plenum 34, and the second end of the air hose 38 is attached to a second coupling positioned about an opening at the top of the livewell tank 12. This arrangement provides a mechanism for removing air from the livewell tank 12 and plenum 34 during operation.

Electronics

The pressurized livewell system also preferably includes a water pressure sensor 20, such a pressure transducer, for constantly monitoring the pressure of the water within the tank 12. The pressure sensor 20 is operatively connected to a digital electronic controller 22, which receives digital pressure data from the pressure sensor 20. The digital electronic controller 22 (also referred to herein as an "electronic controller") is also operatively connected to the pump 18, or to multiple pumps in some embodiments. The electronic controller 22 is preferably programmed with an algorithm to maintain a constant water pressure within the tank 12, preferably between about 0.08 psi (pounds per square inch) to 1.2 psi, and most preferably at 0.1 psi, although it is contemplated that different pressure ranges may be maintained, as desired. The pressure sensor 20 continuously feeds water pressure data to the electronic controller 22, which continuously increases or decreases voltage to the 18 pump, as necessary, to maintain a desired water pressure. The pump 18, pressure sensor 20 and electronic controller 22 are all connected to a power source, such as a battery, although it should be understood that any suitable power source may be used to power the electronic components described herein. The electronic controller 22 may include a control interface 40, which allows a user to control the pump 18 via the electronic controller 22, either manually by pressing buttons or icons to increase or decrease voltage to the pump, or automatically, by allowing a user to set a desired water pressure, so that the electronic controller 22 simply maintains water pressure at the user selected setting. The control interface is preferably located on the helm or console of the boat, for ease of operation by a user who is also driving the boat, but it should be understood that the control interface may be positioned in any desired location.

The pressurized livewell system 10 may be operated manually or automatically. In manual mode, a user may control the voltage, and thereby the output pressure, of the pump 18 by pressing a button (or any suitable type of switch or icon on a touchscreen, for example) with an up arrow or a down arrow. The button or icon with the up arrow increases voltage to the pump 18, increasing pump output, while the down button decreases voltage to the pump 18, thus decreasing pump output. This manual operation of pump voltage and output also serves to control the circular motion of the water in the tank 12.

In one example, manual mode operates as follows:

With the drain 30 at the bottom of the tank in the closed position (or plugged), the rate of water flow from a 1500 gph (gallon per hour) pump 18 through the intake plate fills the tank 12 and plenum 34 until it overflows at the top of the plenum chamber via a 90-degree fitting. The 90-degree fitting is attached to a one-way check valve 36 that is designed to open at a 0.5 psi crack pressure (fully open at 1.5 psi). The fill rate in conjunction with the check valve 36 maintains a certain water height within the tank 12. This arrangement results in a constant flow rate into and out of the tank 12 without causing water to spill out when the lid is opened. This flow rate creates a vacuum within the plenum 34 chamber as this process serves to evacuate substantially all of the air located at the top of the tank in order to create and maintain a fully pressurized system. This effect is accomplished through a small air hose 38 running from the lid flange to the inside plenum 34 chamber.

In automatic mode, a user simply selects a desired pressure on the control interface 40 that is operatively connected to the electronic controller, and the tank 12 automatically fills up with water and maintains the selected pressure level within the tank 12 by constantly measuring water through the pressure sensor 20, and adjusting voltage to the pump 18 as dictated by the algorithm programmed into the electronic controller 22 in a 'set it and forget it' manner.

In one example, automatic mode operates as follows:

In automatic mode the pressurized livewell system 10 maintains water pressure of about 0.1 psi (0.08 psi to 1.2 psi). This effect is accomplished through a sophisticated algorithm written to use in an EmpireBus digital electronic controller 22 system. The water pressure data is generated by a pressure transducer 20 that is mounted in the top side of the tank 12 on an inner portion thereof. This transducer 20 preferably measures from 0 psi to 1 psi and transmits that data to the digital electronic controller 22, which uses the algorithm to constantly adjust the pump voltage, in order to maintain the 0.1 psi pressure. This transducer 20 has been found to maintain an accuracy of 1%. One particularly effective pressure transducer 20 is the TDH43 Series Pressure Transducer, which utilized piezoresistance technology to obtain precise water pressure data.

In one embodiment, the system is installed on a boat, which may include a pair of livewell tanks 12, preferably with one on the port side and one on the starboard side, as shown in FIG. 1. The system may include multiple, redundant pumps 18 and an electronic controller 22 that maintains constant water pressure in both tanks, according to water pressure sensor data from pressure transducers 20 positioned in an upper portion of each tank 12. Ideally, the system provides a constant flow of water into the tank 12 and out of the tank 12, maintaining a constant water pressure and a substantially full tank 12 of freshly supplied water, and creating a vacuum effect when the lid of the tank 12 is in the closed position. This system prevents sloshing, and maintains a healthy, undisturbed environment for live bait, even in choppy or rough water.

It should be understood that this livewell system 10 may be used not only for bait fish, but also for the catch of the day, such as lobster, crabs, crawfish, and smaller fish like trout, bream, crappie and the like. Additionally, the livewell tank 12 may serve as a cooler that can contain ice, beverages, and the like.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A pressurized livewell system comprising:
   a livewell tank configured to hold water at an elevated water pressure;
   a water intake apparatus operatively connected to said livewell tank for providing water to said livewell tank, said water intake apparatus comprising an intake pump, and at least one intake hose operatively connected to said intake pump;
   a pressure sensor disposed within said livewell tank for measuring water pressure;
   an electronic controller operatively connected to said pressure sensor and said intake pump;
   a water outflow apparatus operatively connected to said livewell tank for removing water from said livewell tank, said water outflow apparatus comprising at least one drain hose operatively connected to said livewell tank;
   wherein said electronic controller continuously receives water pressure data from said pressure sensor and continuously increases or decreases voltage to said intake pump in order to maintain a generally constant water pressure within said livewell tank such that the livewell tank is full of water.

2. The pressurized livewell system set forth in claim 1, wherein said pressure sensor is a pressure transducer.

3. The pressurized livewell system set forth in claim 1, wherein said drain hose includes an in-line check valve disposed therein.

4. The pressurized livewell system set forth in claim 1, wherein said livewell includes a drain positioned at a bottom portion of said livewell tank.

5. The pressurized livewell system set forth in claim 1, wherein said intake system further includes a sea chest connected to said intake hose, and wherein said sea chest includes multiple intake pumps for pumping water into said livewell tank.

6. The pressurized livewell system set forth in claim 1, wherein said electronic controller is programmed with an algorithm that allows said electronic controller to receive water pressure data from said pressure sensor, and to vary the voltage to said intake pump in order to maintain a generally consistent water pressure within said livewell tank.

7. The pressurized livewell system set forth in claim 6, wherein said water pressure within said livewell tank ranges between 0.08 psi and 0.12 psi.

8. The pressurized livewell system set forth in claim 1, wherein said water outflow apparatus includes a plenum operatively connected to said livewell tank, wherein said plenum includes an opening at a bottom portion thereof for receiving water from said livewell tank, and further includes an opening at a top portion thereof that is connected to said drain hose.

9. The pressurized livewell system set forth in claim 8, further including an air vent assembly attached to said livewell tank for removing air from said plenum.

10. The pressurized livewell system set forth in claim 1, wherein said water intake apparatus includes two intake hoses operatively connected to said pump, wherein one a first intake hose is connected to a lower portion of said livewell tank and a second intake hose is connected to an upper portion of said livewell tank.

11. The pressurized livewell system set forth in claim 10, wherein said intake hoses are positioned on one side of said livewell tank in an offset position to create a generally uniform circular flow of water within said livewell tank.

12. The pressurized livewell system set forth in claim 1, wherein said livewell tank includes a lid on a top portion thereof that alternates between an open and closed position.

13. The pressurized livewell system set forth in claim 1, further including a control interface operatively connected to said electronic controller, wherein said control interface includes controls allowing a user to manually increase or decrease pressure within said livewell tank, and further, includes controls allowing a user to select a desired water pressure level that is automatically maintained by said electronic controller.

14. A pressurized livewell system comprising:

a livewell tank configured to hold water at an elevated water pressure;

at least one water pump configured to provide water into the livewell tank;

a pressure sensor configured to measure water pressure within the livewell tank;

an electronic controller operatively connected to the pressure sensor and the intake pump, the electronic controller being configured to continuously receive water pressure sensor data from the pressure sensor and adjust electric voltage to the at least one water pump in order to maintain the elevated water pressure such that the livewell tank is full of water.

15. The pressurized livewell system set forth in claim 14, wherein the electronic controller is programmed with an algorithm that allows the electronic controller to receive water pressure data from the pressure sensor, and to vary the voltage to the at least one water pump in order to maintain the elevated water pressure at a generally consistent water pressure value ranging from between 0.08 psi and 0.12 psi.

16. The pressurized livewell system set forth in claim 14, further comprising:

a water outflow apparatus operatively connected to the livewell tank for removing water from the livewell tank, the water outflow apparatus further comprising at least one drain hose operatively connected to the livewell tank.

17. The pressurized livewell system set forth in claim 16, wherein the water outflow apparatus includes a plenum operatively connected to the livewell tank, wherein the plenum includes an opening at a bottom portion thereof for receiving water from the livewell tank, and further includes an opening at a top portion thereof that is connected to the drain hose.

18. The pressurized livewell system set forth in claim 17, further including an air vent assembly attached to the livewell tank for removing air from the plenum.

* * * * *